(12) United States Patent
Lee

(10) Patent No.: US 11,631,414 B2
(45) Date of Patent: Apr. 18, 2023

(54) SPEECH RECOGNITION METHOD AND SPEECH RECOGNITION APPARATUS

(71) Applicant: Samsung Electronics Co., Ltd., Suwon-si (KR)

(72) Inventor: Jihyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 16/843,298

(22) Filed: Apr. 8, 2020

(65) Prior Publication Data

US 2021/0118446 A1 Apr. 22, 2021

(30) Foreign Application Priority Data

Oct. 22, 2019 (KR) ........................ 10-2019-0131618

(51) Int. Cl.
*G10L 15/26* (2006.01)
*G10L 15/16* (2006.01)

(52) U.S. Cl.
CPC .............. *G10L 15/26* (2013.01); *G10L 15/16* (2013.01)

(58) Field of Classification Search
None
See application file for complete search history.

(56) References Cited

U.S. PATENT DOCUMENTS

| 7,421,387 B2 | 9/2008 | Godden |
| 7,747,437 B2 | 6/2010 | Verhasselt et al. |
| 7,761,296 B1 | 7/2010 | Bakis et al. |
| 9,424,839 B2 * | 8/2016 | Yamamuro ............. G10L 15/08 |
| 2014/0372120 A1 * | 12/2014 | Harsham ................. G10L 15/22 704/251 |
| 2014/0372122 A1 * | 12/2014 | Harsham ............. G06F 3/04883 704/257 |

FOREIGN PATENT DOCUMENTS

| JP | 3440840 B2 | 8/2003 |
| JP | 2006-053683 A | 2/2006 |
| JP | 4239479 B2 | 3/2009 |
| JP | 4283133 B2 | 6/2009 |
| JP | 6461308 B2 | 1/2019 |
| KR | 10-2008-0078466 A | 8/2008 |
| KR | 10-1727306 B1 | 5/2017 |

OTHER PUBLICATIONS

EESR issued on Dec. 3, 2020 in counterpart European Patent Application No. 20183502.2 (11 pages in English).

\* cited by examiner

*Primary Examiner* — Stella L. Woo
(74) *Attorney, Agent, or Firm* — NSIP Law

(57) ABSTRACT

A speech recognition method includes receiving speech data, obtaining candidate texts corresponding to the speech data and respective scores of the candidate texts using a speech recognition model, adjusting the score of a current candidate text, from among the obtained candidate texts, in response to a text length of the current candidate text satisfying a condition determined based on text lengths of the obtained candidate texts, and determining a target text corresponding to the speech data, from among the obtained candidate texts and the current candidate texts.

32 Claims, 9 Drawing Sheets

| Candidate text | Score | Text length | Weight |
|---|---|---|---|
| Hi Bixby | -3.46 | 2 | 4 |
| Hi Bixby how can I get to the airport | -6.12 | 9 | 0 |
| Hi Bixby how can I get to the airpot | -6.40 | 9 | 0 |
| Hi Bixby how can I get to the airfort | -6.45 | 9 | 0 |
| Hi Bixby how can I get to the aifort | -7.02 | 9 | 0 |
| Hi Bixby how can I get to the ailport | -7.15 | 9 | 0 |
| Hi Bixby how can I get to the eilport | -7.17 | 9 | 0 |
| Hi Bixby how can I get to the ailpot | -7.20 | 9 | 0 |

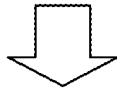

| Candidate text | Score |
|---|---|
| Hi Bixby how can I get to the airport | -6.12 |
| Hi Bixby how can I get to the airpot | -6.40 |
| Hi Bixby how can I get to the airfort | -6.45 |
| Hi Bixby how can I get to the aifort | -7.02 |
| Hi Bixby how can I get to the ailport | -7.15 |
| Hi Bixby how can I get to the eilport | -7.17 |
| Hi Bixby how can I get to the ailpot | -7.20 |
| Hi Bixby | -7.46 |

FIG. 5

| Candidate text | Score | Text length |
|---|---|---|
| Hi Bixby | -3.46 | 2 |
| Hi Bixby how can I get to the airport | -6.12 | 9 |
| Hi Bixby how can I get to the airpot | -6.40 | 9 |
| Hi Bixby how can I get to the airfort | -6.45 | 9 |
| Hi Bixby how can I get to the aifort | -7.02 | 9 |
| Hi Bixby how can I get to the ailport | -7.15 | 9 |
| Hi Bixby how can I get to the eilport | -7.17 | 9 |
| Hi Bixby how can I get to the ailpot | -7.20 | 9 |

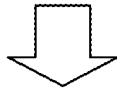

| Candidate text | Score |
|---|---|
| Hi Bixby how can I get to the airport | -6.12 |
| Hi Bixby how can I get to the airpot | -6.40 |
| Hi Bixby how can I get to the airfort | -6.45 |
| Hi Bixby how can I get to the aifort | -7.02 |
| Hi Bixby how can I get to the ailport | -7.15 |
| Hi Bixby how can I get to the eilport | -7.17 |
| Hi Bixby how can I get to the ailpot | -7.20 |
| Hi Bixby | Excluded |

FIG. 7

| Candidate text | Score | Text length | Weight |
|---|---|---|---|
| when do you get up on Sunday | -4.67 | 7 | 0.84 |
| when do you get up on Sunday not Saturday | -4.81 | 9 | 0.50 |
| when do you get up on Sundays | -4.93 | 7 | 0.84 |
| when do you getup on Sunday not Saturday | -5.55 | 8 | 0.17 |
| when do you getup on Sunday | -4.72 | 6 | 1.51 |
| when do you get up on Sunday not on Saturday | -5.04 | 10 | 1.18 |
| when do you get up on Sundays not on Saturdays | -5.07 | 10 | 1.18 |
| when do you get up on Sunday or Saturday | -5.10 | 9 | 0.50 |

<Table 1>

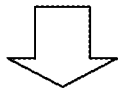

| Candidate text | Score |
|---|---|
| when do you get up on Sunday not Saturday | -5.31 |
| when do you get up on Sunday | -5.51 |
| when do you get up on Sunday or Saturday | -5.60 |
| when do you getup on Sunday not Saturday | -5.72 |
| when do you get up on Sundays | -5.77 |
| when do you get up on Sunday not on Saturday | -6.22 |
| when do you getup on Sunday | -6.23 |
| when do you get up on Sundays not on Saturdays | -6.25 |

<Table 2>

FIG. 9

SPEECH RECOGNITION METHOD AND SPEECH RECOGNITION APPARATUS

CROSS-REFERENCE TO RELATED APPLICATIONS

This application claims the benefit under 35 USC § 119(a) of Korean Patent Application No. 10-2019-0131618 filed on Oct. 22, 2019 in the Korean Intellectual Property Office, the entire disclosure of which is incorporated herein by reference for all purposes.

BACKGROUND

1. Field

The following description relates to speech recognition technology.

2. Description of Related Art

Speech recognition is technology for a computer to convert a speech uttered by a human for communication into text data by interpreting the speech. Speech recognition technology rapidly develops with user demands for convenience. Technology for speech recognition using a neural network has been actively studied. The neural network is a model that models characteristics of biological nerve cells of a human by mathematical expressions, and employs an algorithm that simulates a learning capability of a human brain. The neural network has a generalization capability of generating a relatively accurate output with respect to an input pattern yet to be used for training, based on a result of learning. By reason of the generalization capability, such neural networks are widely used in the field of speech recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speech recognition method includes receiving speech data, obtaining candidate texts corresponding to the speech data and respective scores of the candidate texts using a speech recognition model, adjusting the score of a current candidate text, from among the obtained candidate texts, in response to a text length of the current candidate text satisfying a condition determined based on text lengths of the obtained candidate texts, and determining a target text corresponding to the speech data, from among the obtained candidate texts and the current candidate text.

The speech recognition method may further include determining whether a difference between the text length of the current candidate text and a text length determined based on the text lengths of the obtained candidate texts satisfies the condition.

The text length determined based on the text lengths of the obtained candidate texts may be an average of the text lengths of the obtained candidate texts.

The text length determined based on the text lengths of the obtained candidate texts may be an average of the text lengths of the obtained candidate texts excluding a greatest text length and a smallest text length among the obtained candidate texts.

The determining whether the difference satisfies the condition may include determining that the condition is satisfied, in response to the difference being greater than a threshold determined based on a standard deviation of the text lengths of the obtained candidate texts.

The adjusting may include determining a weight corresponding to the current candidate text, and determining a weighted score by applying the weight to the score of the current candidate text.

The determining of the weight may include determining a weight to be applied to the current candidate text based on a difference between the text length of the current candidate text and a text length determined based on the text lengths of the obtained candidate texts.

In another general aspect, a speech recognition method includes receiving speech data, obtaining candidate texts corresponding to the speech data and respective scores of the candidate texts using a speech recognition model, and determining a target text corresponding to the speech data based on the scores of the obtained candidate texts other than a current candidate text, in response to a text length of the current candidate text satisfying a condition determined based on text lengths of the obtained candidate texts.

The determining of the target text may include determining a candidate text having a highest score among the obtained candidate texts other than the current candidate text, to be the target text.

In another general aspect, a speech recognition method includes receiving speech data, obtaining a plurality of candidate texts corresponding to the speech data and respective scores of the candidate texts using a speech recognition model, adjusting the respective scores of the candidate texts based on text lengths of the candidate texts, and determining a target text corresponding to the speech data, from among the candidate texts, based on a result of the adjusting.

The adjusting may include determining a weight corresponding to a current candidate text included in the obtained candidate texts, and determining a weighted score by applying the weight corresponding to the current candidate text to the score of the current candidate text.

The determining of the weight may include determining a weight to be applied to the current candidate text based on a difference between a text length of the current candidate text and a text length determined based on the text lengths of the obtained candidate texts.

In another general aspect, a speech recognition apparatus includes one or more processors, wherein the one or more processors are configured to receive speech data, obtain candidate texts corresponding to the speech data and respective scores of the candidate texts using a speech recognition model, adjust the score of a current candidate text, from among the obtained candidate texts, in response to a text length of the current candidate text satisfying a condition determined based on text lengths of the obtained candidate texts, and determine a target text corresponding to the speech data, from among the obtained candidate texts and the current candidate text.

In another general aspect, a speech recognition apparatus includes one or more processors, wherein the one or more processors are configured to receive speech data, obtain candidate texts corresponding to the speech data and respective scores of the candidate texts using a speech recognition model, and determine a target text corresponding to the speech data based on the scores of the obtained candidate texts other than a current candidate text, in response to a text length of the current candidate text satisfying a condition determined based on text lengths of the obtained candidate texts.

In another general aspect, a speech recognition apparatus includes one or more processors, wherein the one or more processors are configured to receive speech data, obtain candidate texts corresponding to the speech data and respective scores of the candidate texts using a speech recognition model, adjust the respective scores of the candidate texts based on text lengths of the candidate texts, and determine a target text corresponding to the speech data, from among the candidate texts, based on the adjusted scores.

In another general aspect, a processor-implemented method includes obtaining candidate texts corresponding to received speech data and a score for each of the candidate texts using a speech recognition model; adjusting the score of one or more of the candidate texts based on a difference between a text length of each of the respective one or more candidate texts and a value that is calculated based on text lengths of a plurality of the obtained candidate texts; and after the adjusting, selecting a target text that corresponds to the speech data based on the scores of the candidate texts, and outputting the target text.

The plurality of the obtained candidate texts may include all of the obtained candidate texts.

The plurality of the obtained candidate texts may include all of the obtained candidate texts except for at least one of the obtained candidate texts having a largest text length or a smallest text length.

The value may be an average text length of the text lengths of the plurality of obtained candidate texts.

The value may be based on a standard deviation of the text lengths of the plurality of obtained candidate texts.

Other features and aspects will be apparent from the following detailed description, the drawings, and the claims.

BRIEF DESCRIPTION OF THE DRAWINGS

FIG. 5 illustrates an example of a speech recognition process.

FIG. 7 illustrates an example of a speech recognition process.

FIG. 9 illustrates an example of a speech recognition process.

Figure 1:
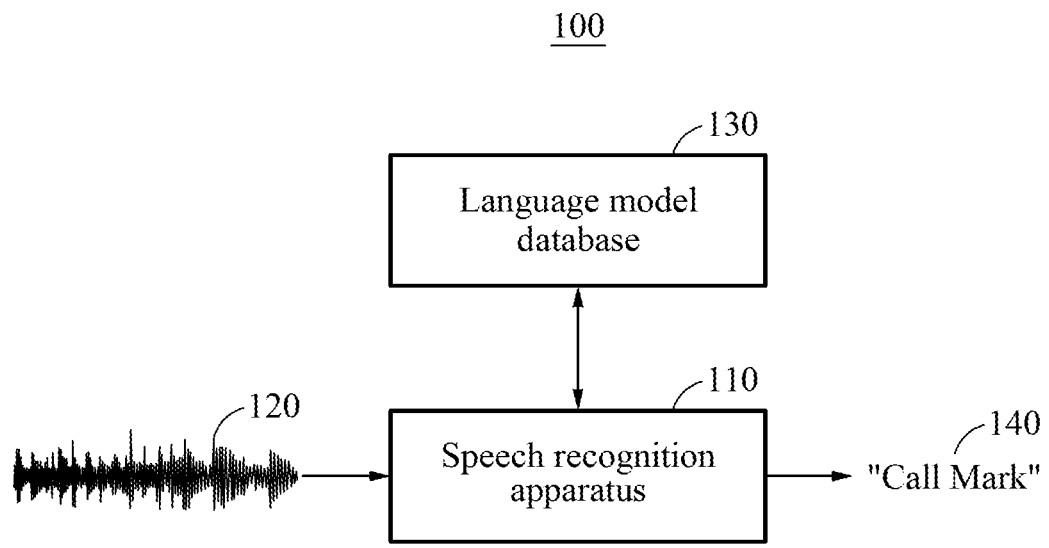
FIG. 1 illustrates an example of an overview of a speech recognition system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Accordingly, the examples are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). Further, it should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. Like reference numerals in the drawings denote like elements, and thus their description will be omitted.

FIG. 1 illustrates an example of an overview of a speech recognition system.

Referring to FIG. 1, a speech recognition system 100 is run on one or more computers or terminals. In an example, a user inputs a predetermined command into the speech recognition system 100 through a speech input 120. The speech input 120 includes sequences of words, and each sequence of words includes words, subwords subordinate to words, a phrase, or a sentence.

The speech recognition system 100 estimates a target text 140 corresponding to the speech input 120 by analyzing speech data corresponding to the speech input 120 from the user. The speech recognition system 100 estimates the command from the user implied in the target text 140 from the estimated target text 140, and provides the user with a result of executing the extracted command. For example, if the target text 140 corresponding to the speech input 120 is recognized as "Call Mark", the speech recognition system 100 retrieves a phone number of Mark from a contact database and performs a function to make a call with the phone number of Mark. The speech recognition system 100 may be utilized for various applications such as machine translation and a man-machine conversation engine, in addition to the recognition of the command included in the speech input 120 of the user.

The speech recognition system 100 includes a speech recognition apparatus 110 programmed to receive the speech data of the speech input 120 and convert the speech input 120 to the target text 140. The speech recognition apparatus 110 generates text data corresponding to the speech input 120 by analyzing the speech data of the speech input 120. The speech recognition apparatus 110 may be implemented by software modules, hardware modules, or a combination thereof configured to convert words included in the speech input 120 into text. The speech recognition apparatus 110 may be embedded in a mobile phone, a cellular phone, a smart phone, a personal computer, a laptop, a notebook, a netbook or tablet, a personal digital assistant (PDA), a digital camera, a game console, an MP3 player, a personal multimedia player (PMP), an electronic book (E-Book), a navigation system, a disk player, a set-top box, a home appliance, and other electronic devices, or may interoperate therewith. Further, the speech recognition apparatus 110 may be embedded in a smart home appliance, an intelligent vehicle, an autonomous vehicle, a smart home environment, a smart building environment, a smart office environment, a smart electronic security system, and a wearable device to be worn on the user, or may interoperate therewith.

The speech recognition apparatus 110 uses a language model stored in a language model database 130 to improve the accuracy of a speech recognition result. The language model is a component constituting a natural language processing engine, and is used to provide a natural expression corresponding to a result of recognizing the speech input. The language model provides probability values related to words (including subwords), phrases, and/or sentences, and the speech recognition apparatus 110 determines a speech recognition result based on text expressions provided by the language model and probability values of the text expressions. One or more language models are used to determine the speech recognition result. The language model used for speech recognition includes, for example, a general language model independent of a domain of the speech input, a language model trained with a corpus including speech expressions principally used for each domain, and a personalized language model (PLM) which is based on user information or information (for example, contacts) stored on a user terminal such as a smart phone. The language model database 130 is included in the speech recognition apparatus 110 or positioned outside of the speech recognition apparatus 110. If the language model database 130 is positioned outside of the speech recognition apparatus 110, the language model database 130 may exist in a server (not shown) capable of communicating with the speech recognition apparatus 110.

In determining the target text 140, the speech recognition apparatus 110 first obtains a number of candidate texts that are likely to correspond to the speech input 120, selects an optimal candidate text from the obtained candidate texts, and determines the selected candidate text to be the target text 140. The speech recognition apparatus 110 obtains scores of the candidate texts together with the candidate texts, and selects the target text 140 from the candidate texts based on the scores. A score is, for example, an index indicating a probability or a possibility a candidate text corresponds to a desired target text 140.

In general, if there is loud noise around when a speech input is input into a speech recognition apparatus, or depending on a state of training data used to train a speech recognition model, a result missing a portion of a speech that should be included in the speech input or a result where a portion appears in duplicate may be incorrectly determined to be a speech recognition result. A score of each candidate text used to determine the speech recognition result is determined based on a product of probabilities of components (for example, words or tokens) constituting the candidate text. In this example, the score decreases as a text length of the candidate text increases, and thus the candidate text may be disadvantageous to be selected as a target text. Accordingly, an extremely short target text when compared to an actual utterance of the user may be incorrectly determined to be the speech recognition result. To solve the issue of incorrectly determining a short target text to be the speech recognition result, normalization may be used. However, normalization may bring about an issue of incorrectly determining an extremely long target text to be the speech recognition result.

According to examples set forth hereinafter, the speech recognition apparatus 110 prevents a result missing a portion of an utterance or a result where a portion appears in duplicate from being incorrectly determined to be a speech recognition result. For example, the speech recognition apparatus 110 adjusts scores of candidate texts in view of text lengths of the candidate texts, thereby preventing a result missing a portion of an utterance or a result where a portion appears in duplicate from being determined to be a final speech recognition result. In detail, with respect to a candidate text with a great text length difference from other candidate texts, the speech recognition apparatus 110 decreases a probability the candidate text is selected as a target text, by applying a penalty to the candidate text. In another example, in determining a target text, the speech recognition apparatus 110 excludes candidate texts with relatively great text length difference from other candidate texts, among the candidate texts, thereby preventing an extremely short or long candidate text when compared to a desired target text, from being determined as a final speech recognition result. Through such technical features, the speech recognition apparatus 110 improves the accuracy of speech recognition results.

Hereinafter, a speech recognition process performed by the speech recognition apparatus 110 will be described.

Figure 2:
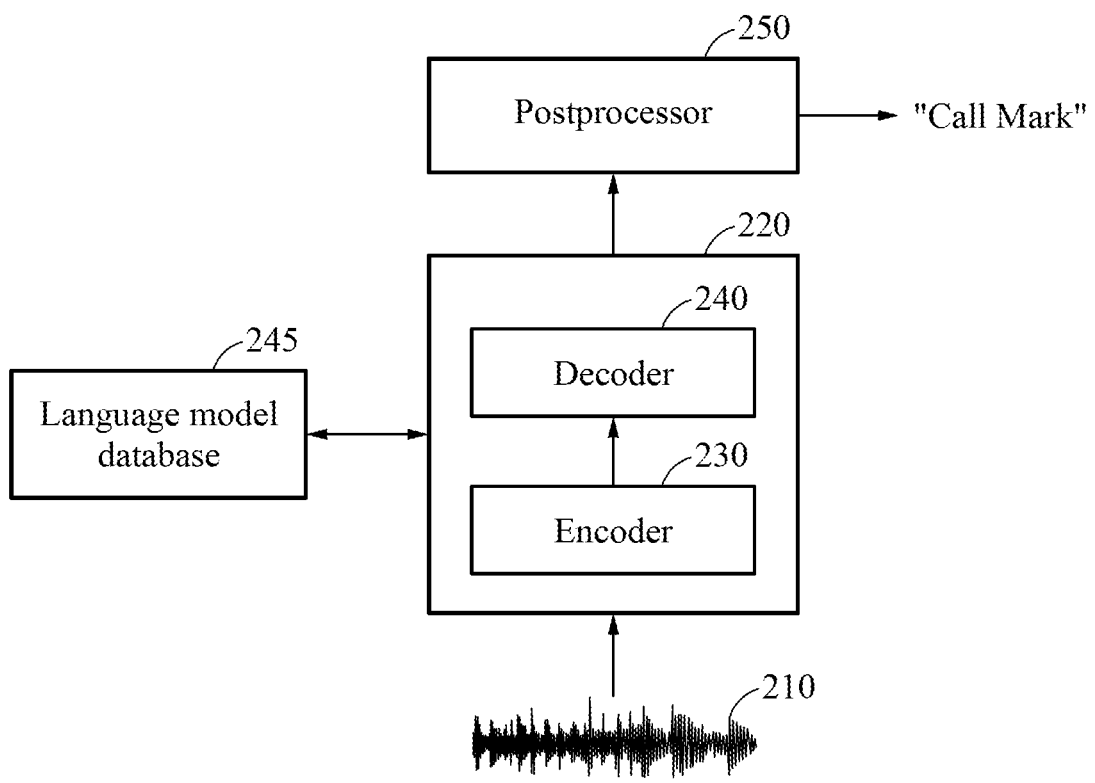
FIG. 2 illustrates an example of an operation of a speech recognition apparatus.

FIG. 2 illustrates an example of an operation of a speech recognition apparatus.

Referring to FIG. 2, a speech recognition apparatus includes a candidate text determiner 220 and a postprocessor 250.

The candidate text determiner 220 receives speech data of a speech input 210 and determines candidate texts corresponding to the speech input 210 and scores of the candidate texts. The candidate text determiner 220 determines the candidate texts using an encoder-decoder based speech recognition model (or speech recognition engine). The speech recognition model is, for example, an end-to-end automatic speech recognition (E2E ASR) model configured to receive the speech data of the speech input 210 and generate candidate texts corresponding to the speech input 210. In another example, the speech recognition model is a deep neural network-hidden Markov model (DNN-HMM) based speech recognition model.

The speech recognition model includes an encoder 230 configured to extract feature values (for example, feature vectors) from the speech data, and a decoder 240 configured to output candidate texts and scores of the candidate texts based on the feature values extracted by the encoder 230. The encoder 230 and the decoder 240 may be implemented by a single neural network or implemented by separate neural networks.

The encoder 230 converts the speech data into abstract feature vectors, and the decoder 240 determines the candidate texts based on the feature vectors. For example, the encoder 230 receives the speech data in the way format and generates vector values implying information of the speech data. The decoder 240 receives the vector values from the encoder 230 and determines one or more candidate texts corresponding to the same. The decoder 240 outputs the candidate texts corresponding to the speech data in units of words or subwords. In the examples provided herein, a "word" included in a candidate text includes a "subword" which is a component unit smaller than the "word", unless otherwise mentioned. The "word" is formed of a combination of "subwords" having meanings. A "subword" corresponds to, for example, a word piece, a segment of a word separated by a byte pair encoding (BPE) algorithm, a token, or a character.

The decoder 240 selects N candidate texts with relatively high probabilities of corresponding to the speech input 210 based on the feature values (for example, vector values) received from the encoder 230, N being a natural number. For example, the decoder 240 determines the N candidate texts with relatively high probabilities of corresponding to the target text using beam search. Beam search is a technique that is based on best-first search and increases efficiency by limiting the number of nodes to be stored in a memory. The decoder 240 selects the candidate texts in a manner that extends the range of candidate texts by determining a probability distribution of words constituting a candidate text in each decoding operation and selecting a predetermined number of words in descending order of probability values. The decoder 240 determines the candidate texts by iteratively performing an operation of sequentially estimating words constituting the entire text corresponding to the speech input 210. For example, the decoder 240 estimates words of a current point in time based on the feature values received from the encoder 230 and words determined at a previous point in time.

The candidate text determiner 220 uses a language model stored in a language model database 245 to increase the recognition rate with respect to an expression not covered by the speech recognition model. The language model database 245 may be included in the speech recognition apparatus or is positioned outside of the speech recognition apparatus. The language model provides various utterance expressions that may be proposed using the speech input 210, for example, based on a neural network, n-gram, or a word/character string list. A plurality of such language models may be provided. For example, the language model includes a language model specialized in a predetermined domain. The candidate text determiner 220 determines scores of the candidate texts determined by the decoder 240, using the language model. For example, the candidate text determiner 220 calculates the scores of the candidate texts using N-best rescoring which uses a default language model or an external language model. The scores are expected values or probability values that the candidate texts correspond to the target text. For example, assuming that a score of a predetermined candidate text is 0.75, the score indicates that a relative probability the candidate text corresponds to a target text which is a final speech recognition result is 0.75.

The postprocessor 250 receives the candidate texts and the scores of the candidate texts from the candidate text determiner 220 and determines a target text among the candidate texts based on relative text lengths of the candidate texts. A text length is the number of words or subwords (for example, tokens or characters) constituting a candidate text.

The postprocessor 250 adjusts scores of one or more candidate texts based on the text lengths of the candidate texts and determines the target text based on a result of the adjusting. For example, the postprocessor 250 adjusts the scores of the one or more candidate texts based on an average and a standard deviation of the text lengths of the candidate texts. The postprocessor 250 adjusts the scores by applying a weight only to a score of a candidate text having a text length greatly different from the average of the text lengths of the candidate texts, or by applying weights to the scores of the candidate texts based on the average and the standard deviation of the text lengths of the candidate texts. Here, a weight is applied as a penalty. If a weight is applied to a score of a candidate text, a probability value or an expected value that the candidate text is determined to be the target text decreases. After the score adjusting process, the postprocessor 250 determines the target text based on the scores of the candidate texts. For example, the postprocessor 250 determines a candidate text with a highest score to be the target text ("Call Mark" in FIG. 2), which is a final speech recognition result.

In another example, if a difference between a text length of a candidate text and the average of the text lengths of the candidate texts is greater than or equal to a threshold, the postprocessor 250 excludes the corresponding candidate text and determines a candidate text with a highest score, among the remaining candidate texts, to be the target text. In this example, without the need to perform score adjustment, a significantly short or long candidate text when compared to the other candidate texts is excluded from candidates for the target text, and the postprocessor 250 determines a candidate text with a highest score, among the remaining candidate texts, to be the target text.

Among candidate texts obtained through beam search, a candidate text with a particularly short or long text length when compared to the other candidate texts may unusually have a highest score. However, target texts corresponding to a correct answer or close to the correct answer generally have similar text lengths. Thus, by adjusting scores using a difference between relative text lengths of candidate texts, it is possible to prevent a candidate text not close to the correct answer from being determined to be a target text. For example, the postprocessor 250 applies a penalty to an overly short or long candidate text when compared to the average of the text lengths of the candidate texts or excludes the overly short or long candidate text, thereby lowering or preventing the possibility the candidate text is selected as the target text.

Through the speech recognition process described above, the speech recognition apparatus provides a stable speech recognition performance (an improvement of the speech recognition accuracy) even in a noisy environment, without being affected by the state of training data.

Figure 3:
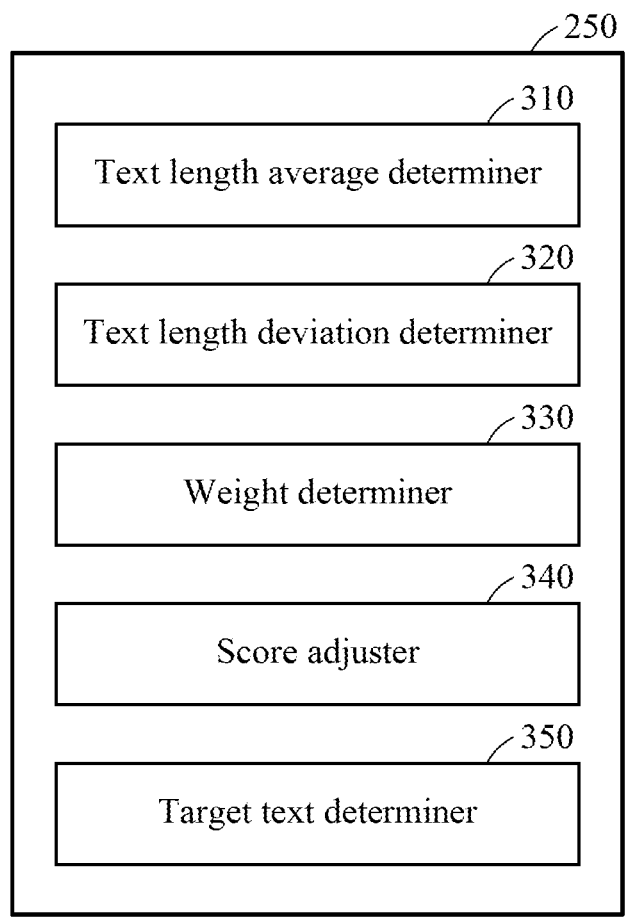
FIG. 3 illustrates an example of a configuration of a postprocessor.

FIG. 3 illustrates an example of a configuration of a postprocessor

Referring to FIG. 3, the postprocessor 250 includes a text length average determiner 310, a text length deviation determiner 320, a weight determiner 330, a score adjuster 340, and a target text determiner 350.

The text length average determiner 310 determines an average of text lengths of a plurality of candidate texts determined through a speech recognition model. For example, the text length average determiner 310 calculates an average of all the text lengths of the candidate texts or an average of remaining text lengths except for a greatest text length and a smallest text length among the text lengths. The text length deviation determiner 320 determines deviations (for example, a standard deviation) of the text lengths based on the average determined by the text length average determiner 310.

The weight determiner 330 determines a weight to be applied to a candidate text. The weight determiner 330 selects a candidate text with an overly short or long text length when compared to the other candidate texts and determines a weight to be applied only to the selected candidate text. For example, the weight determiner 330 determines the weight to be applied to the selected candidate text based on the average and the standard deviation of the text lengths of the candidate texts. In another example, weights corresponding to the candidate texts are determined based on a difference between relative text lengths of the candidate texts, and the weight determiner 330 determines weights to be applied to the candidate texts based on a difference between the text lengths.

The score adjuster 340 adjusts a score of a candidate text requiring score adjustment, by applying a weight to the score of the candidate text.

The target text determiner 350 selects a target text corresponding to a final speech recognition result from among the candidate texts, based on adjusted score information of the candidate texts. For example, the target text determiner 350 determines a candidate text having a highest score to be the target text.

In another example, the target text determiner 350 excludes, from candidates for the target text, a candidate text having a text length greatly different from the average of the text lengths of the candidate texts, and determines a candidate text having a highest score among the remaining candidate texts, to be the target text. In this example, score adjustment is not needed, and thus the weight determiner 330 and the score adjuster 340 may be omitted from the postprocessor 250.

Figure 4:
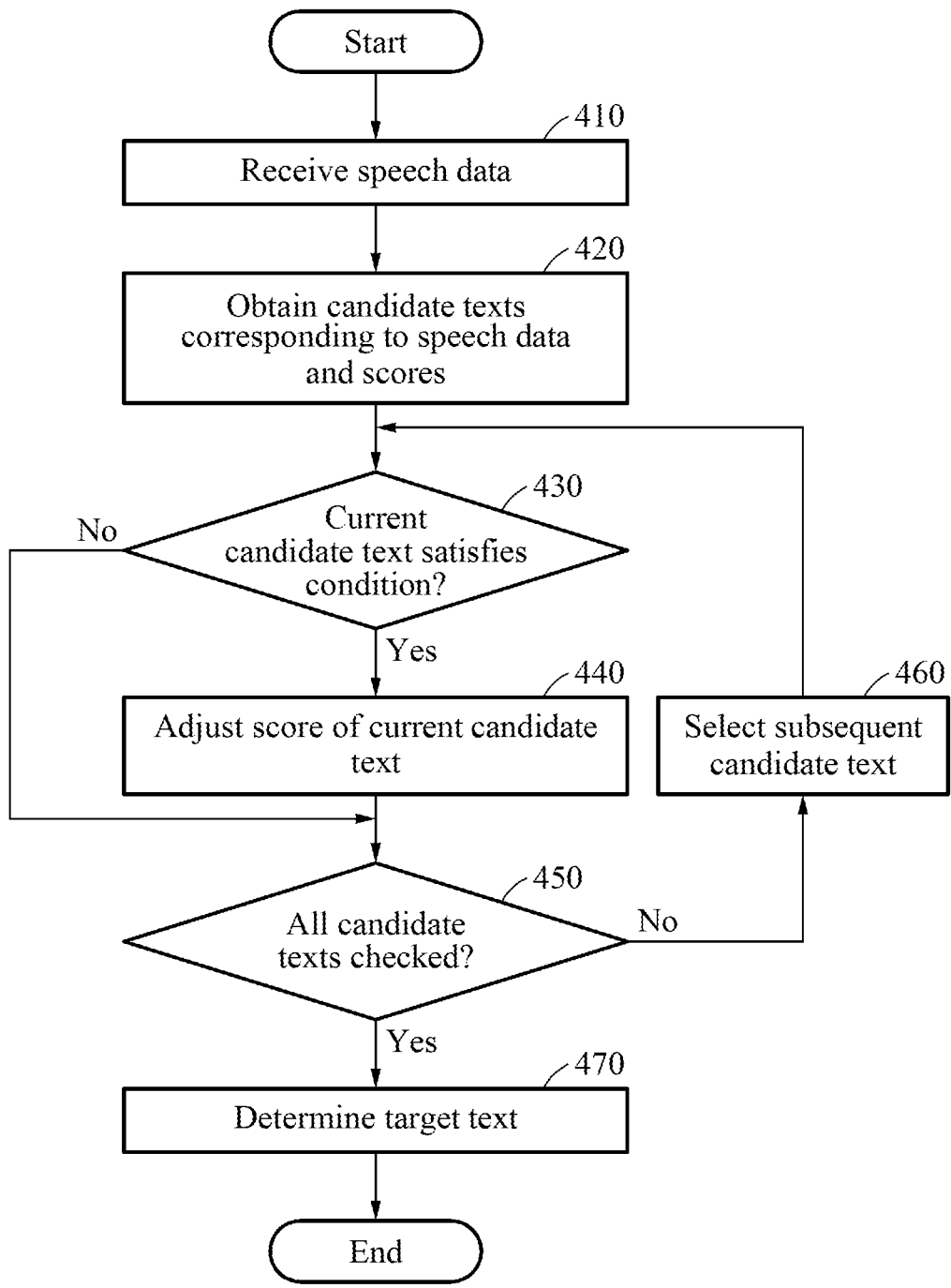
FIG. 4 illustrates an example of a speech recognition method.

FIG. 4 illustrates an example of a speech recognition method.

Referring to FIG. 4, in operation 410, a speech recognition apparatus receives speech data. A user inputs a speech for a voice command or a speech input through a voice interface such as a microphone, and speech data of the input speech is transmitted to the speech recognition apparatus.

In operation 420, the speech recognition apparatus obtains a plurality of candidate texts corresponding to the speech data and respective scores of the candidate texts using a speech recognition model. For example, the speech recognition apparatus uses an encoder-decoder based speech recognition model including an encoder configured to extract vector values from the speech data and a decoder configured to output candidate texts corresponding to the speech data based on the vector values extracted by the encoder. The speech recognition apparatus obtains top N candidate texts based on the scores using beam search, N being a natural number. The speech recognition apparatus determines the respective scores of the candidate texts using a language model.

In operation 430, the speech recognition apparatus determines whether a text length of a current candidate text satisfies a condition determined based on text lengths of the candidate texts. Here, the current candidate text is any one of the candidate texts. The speech recognition apparatus determines whether a difference between the text length of the current candidate text and a text length determined based on the text lengths of the candidate texts satisfies the condition. The text length determined based on the text lengths of the candidate texts is, for example, an average of the text lengths of all the candidate texts or an average of remaining text lengths except for a greatest text length and a smallest text length among the text lengths of the candidate texts. The speech recognition apparatus determines that the condition is satisfied in response to the difference being greater than a threshold determined based on a standard deviation of the text lengths of the candidate texts, and determines that the condition is not satisfied in response to the difference being less than or equal to the threshold.

In response to a determination that the text length of the current candidate text satisfies the condition, the speech recognition apparatus adjusts a score of the current candidate text, in operation 440. The speech recognition apparatus determines a weight corresponding to the current candidate text and determines a weighted score by applying the weight to the existing score of the current candidate text. The speech recognition apparatus determines the weight to be applied to the current candidate text based on the difference between the text length of the current candidate text and the text length determined based on the text lengths of the candidate texts. As the difference increases, the weight increases. When the weight is applied to the score of the current candidate text, a probability value or an expected value that the current candidate text is determined to be a target text decreases.

In operation 450, the speech recognition apparatus determines whether all the candidate texts are checked in operation 430. In response to all the candidate texts being yet to be checked, the speech recognition apparatus selects a subsequent candidate text as the current candidate text, in operation 460. Then, the speech recognition apparatus performs operation 430 again with respect to the selected subsequent candidate text. Through the process described above, the speech recognition apparatus adjusts a score of a predetermined candidate text in view of a difference between relative text lengths of the candidate texts.

In response to all the candidate texts being checked, the speech recognition apparatus determines a target text corresponding to the speech data among the candidate texts based on a result of adjusting the scores, in operation 470. For example, the speech recognition apparatus determines, to be the target text, a candidate text having a highest score, among weighted scores of candidate texts and unadjusted scores of the other candidate texts.

Through the process described above, the speech recognition apparatus adjusts a score of a candidate text with a relatively short or long text length when compared to the other candidate texts, thereby preventing a candidate text with a significantly short or long text lengths from being incorrectly determined to be a target text. Therefore, the accuracy of speech recognition improves.

FIG. 5 illustrates an example of a speech recognition process.

A speech recognition apparatus adjusts a score of a predetermined candidate text based on a difference between relative text lengths of candidate texts. The speech recognition apparatus calculates an average of the text lengths of the candidate texts and adjusts a score of a candidate text selected for comparison in response to a difference between a text length of the selected candidate text and the average being greater than a threshold. The threshold is, for example, a standard deviation of the text lengths of the candidate texts. The speech recognition apparatus determines a weight corresponding to the candidate text, the score of which is to be adjusted, and adjusts the score of the candidate text by applying the weight thereto. The weight increases as the difference between the text length of the candidate text and the average increases.

In an example, a score of a candidate text satisfying a condition of Equation 1 is adjusted.

$$|c.\text{length}-\text{avg}|>\text{th} \qquad \text{[Equation 1]}$$

In Equation 1, c.length denotes a text length of a current candidate text, and avg denotes the average of the text lengths of the candidate texts. avg is an average of the text lengths of all the candidate texts, or an average of remaining text lengths except for a greatest text length and a smallest text length among the text lengths of the candidate texts. th denotes the threshold, which is determined based on the standard deviation of the text lengths of the candidate texts. For example, th is a value obtained by adding a constant to the standard deviation. Whether the condition of Equation 1 is satisfied is determined with respect to each candidate text. A score of a candidate text satisfying the condition of Equation 1 is adjusted based on Equation 2.

$$c.\text{score2}=c.\text{score1}-\text{const}\times|c.\text{length}-\text{avg}| \qquad \text{[Equation 2]}$$

In Equation 2, c.score1 denotes the original score of the current candidate text, and c.length denotes the text length of the current candidate text. const denotes a constant, and avg denotes the average of the text lengths of the candidate texts. const×|c.length−avg| denotes the weight corresponding to the current candidate text and acts as a penalty. c.score2 denotes the score of the current candidate text to which the weight is applied, that is, a weighted score of the current candidate text.

Referring to FIG. 5, the top table shows candidate texts corresponding to speech data, respective scores and text lengths of the candidate texts, and weights corresponding to the text lengths. In this example, a correct answer intended as a speech recognition result is "Hi Bixby how can I get to the airport?". However, among candidate texts, a candidate text of "Hi Bixby" corresponding to an incorrect answer has a highest score despite a significantly short text length when compared to the other candidate texts. The speech recognition apparatus identifies a candidate text with a great difference in text lengths from the other candidate texts, like the candidate text of "Hi Bixby", and adjusts a score of the candidate text by applying to a weight thereto. The bottom table shows the results of adjusting the scores. As a result of adjusting the scores using Equation 2, the initial score of the candidate text of "Hi Bixby" is −3.46, and the score is adjusted to −7.46 by applying the weight thereto. Before the score adjustment, the candidate text of "Hi Bixby" is selected as the target text since the candidate text of "Hi Bixby" has the highest score. On the contrary, after the score adjustment, the candidate text has the lowest score among the candidate texts, and thus another candidate text is selected as the target text.

As described above, in view of an average and a variance of the text lengths of the candidate texts, a penalty for a candidate text with a significantly short or long text length is calculated. By lowering, through the application of a penalty, a score of a candidate text which is likely to be incorrectly selected as a target text due to its relatively short text length, a probability of speech misrecognition is lowered.

Figure 6:
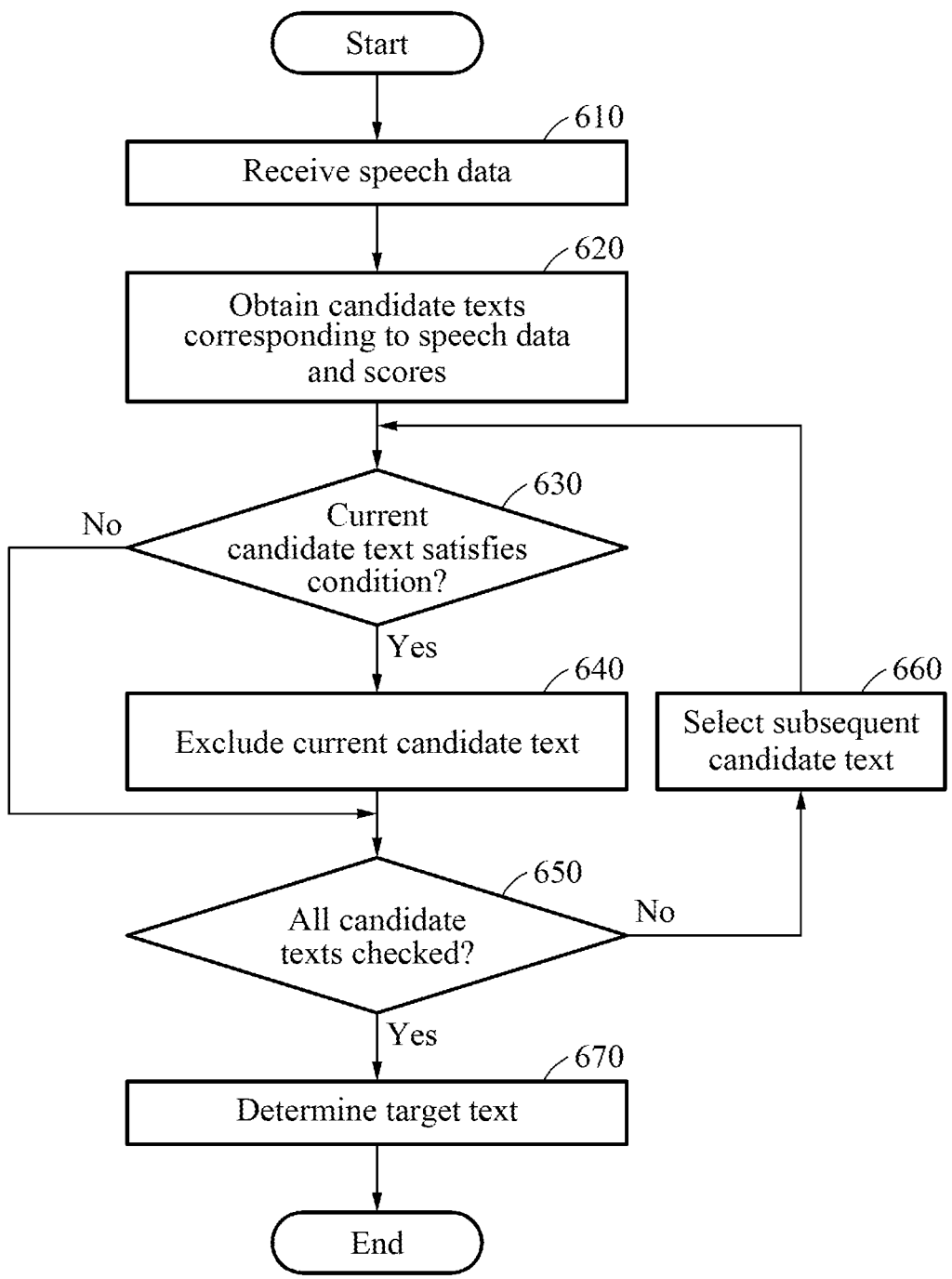
FIG. 6 illustrates an example of a speech recognition method.

FIG. 6 illustrates an example of a speech recognition method.

Referring to FIG. 6, in operation 610, a speech recognition apparatus receives speech data. In operation 620, the speech recognition apparatus obtains a plurality of candidate texts corresponding to the speech data and respective scores of the candidate texts using a speech recognition model. In operation 630, the speech recognition apparatus determines whether a text length of a current candidate text satisfies a condition determined based on text lengths of the candidate texts. Operations 610 to 630 correspond to operations 410 to 430 of FIG. 4, and thus a detailed description thereof will be omitted.

In response to a determination that the text length of the current candidate text satisfies the condition, the speech recognition apparatus excludes the current candidate text from candidates for a target text, in operation 640. In operation 650, the speech recognition apparatus determines whether all the candidate texts are checked in operation 630. In response to all the candidate texts being yet to be checked, the speech recognition apparatus selects a subsequent candidate text as the current candidate text, in operation 660. Then, the speech recognition apparatus performs operation 630 again with respect to the selected subsequent candidate text. Through the process described above, a candidate text with a significantly short or long text length when compared to the other candidate texts is excluded from candidates for a target text.

In response to all the candidate texts being checked, the speech recognition apparatus determines a target text corresponding to the speech data among candidate texts not excluded from the candidates for the target text, in operation 670. Accordingly, in response to a determination that the text length of the candidate text satisfies the condition determined based on the text lengths of the candidate texts, the speech recognition apparatus determines the target text based on scores of the remaining candidate texts except for the current candidate text. For example, the speech recognition apparatus determines a candidate text having a highest score among the remaining candidate texts, to be the target text.

As described above, by excluding a candidate text with a considerably short or long text length from the candidates for the target text in view of an average and a variance of the text lengths of the candidate texts, an occurrence of speech misrecognition is prevented.

FIG. 7 illustrates an example of a speech recognition process.

A speech recognition apparatus excludes a predetermined candidate text from candidates for a target text based on a difference between relative text lengths of candidate texts. The speech recognition apparatus calculates an average of the text lengths of the candidate texts, and excludes, from candidates for a target text, a candidate text selected for comparison in response to a difference between a text length of the selected candidate text and the average being greater than a threshold. In an example, a candidate text satisfying the condition of Equation 1 described above is excluded from the candidates for the target text.

Referring to FIG. 7, the top table shows candidate texts corresponding to speech data, and respective scores and text lengths of the candidate texts. In this example, a correct answer intended as a speech recognition result is "Hi Bixby how can I get to the airport?". However, among candidate texts, a candidate text of "Hi Bixby" corresponding to an incorrect answer has a highest score despite a significantly short text length when compared to the other candidate texts. If the text length of the candidate text satisfies the condition of Equation 1 determined based on the text lengths of the other candidate texts, the candidate text is excluded from a list of the candidates for the target text, as shown in the bottom table. The speech recognition apparatus determines whether to exclude each candidate text from the list of candidates for the target text by checking whether the candidate text satisfies the condition, and determines a candidate text having a highest score among the remaining candidate texts not excluded, to be the target text.

Figure 8:
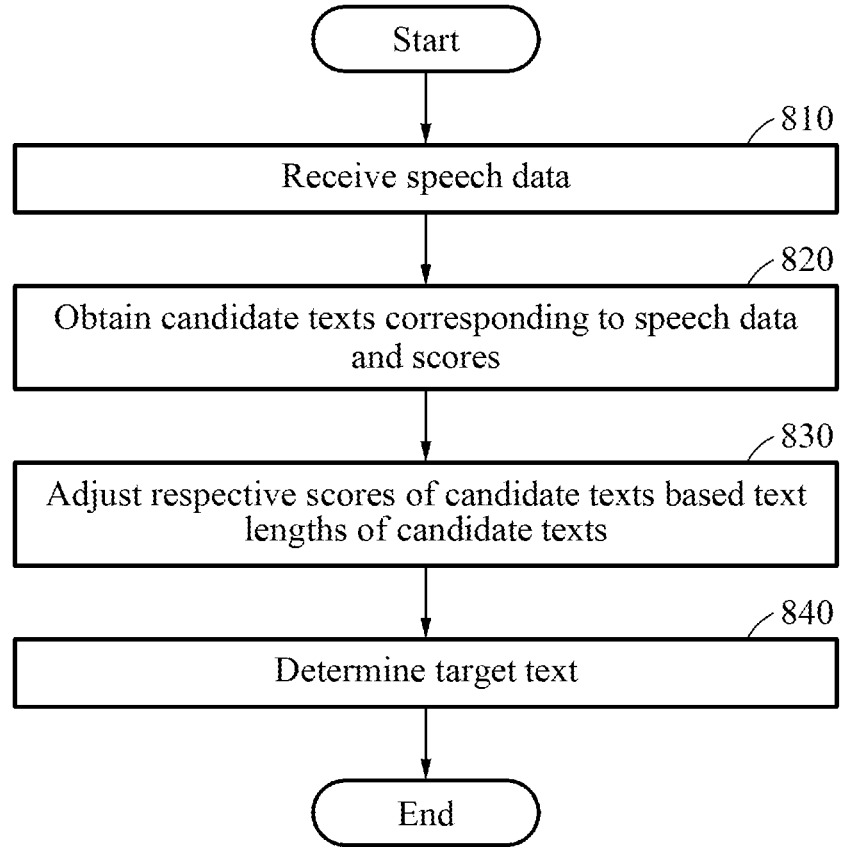
FIG. 8 illustrates an example of a speech recognition method.

FIG. 8 illustrates an example of a speech recognition method.

Referring to FIG. 8, in operation 810, a speech recognition apparatus receives speech data. In operation 820, the speech recognition apparatus obtains a plurality of candidate texts corresponding to the speech data and respective scores of the candidate texts using a speech recognition model. Operations 810 and 820 correspond to operations 410 and 420 of FIG. 4, and thus a detailed description thereof will be omitted.

In operation 830, the speech recognition apparatus adjusts the scores of the candidate texts based on text lengths of the candidate texts. The speech recognition apparatus determines a weight corresponding to a current candidate text included in the candidate texts, and determines a weighted score by applying the determined weight to an existing score of the current candidate text.

The speech recognition apparatus determines the weight to be applied to the current candidate text based on a difference between a text length of the current candidate text and a text length determined based on the text lengths of the candidate texts. The text length determined based on the text lengths of the candidate texts is, for example, an average of the text lengths of all the candidate texts or an average of remaining text lengths except for a greatest text length and a smallest text length among the text lengths of the candidate texts. The speech recognition apparatus determines the weight to be applied to the current candidate text based on a difference between the text length of the current candidate text and the average text length of the candidate texts and a standard deviation of the text lengths of the candidate texts, for example, as expressed by Equation 3 given below. The speech recognition apparatus adjusts the scores of the candidate texts overall by applying respective weights corresponding to the candidate texts to the scores of the candidate texts.

In operation 840, the speech recognition apparatus determines a target text corresponding to the speech data among the candidate texts based on a result of the adjusting of operation 830. The speech recognition apparatus determines the target text based on weighted scores determined by applying the respective weights of the candidate texts to the scores of the candidate texts. For example, the speech recognition apparatus determines a candidate text having a highest weighted score to be the target text.

FIG. 9 illustrates an example of a speech recognition process.

A speech recognition apparatus adjusts scores of candidate texts overall based on a difference between relative text lengths of the candidate texts. The speech recognition apparatus calculates an average and a standard deviation of the text lengths of the candidate texts, and determines weights to be applied to respective scores of the candidate texts based on the average and the standard deviation. The speech recognition apparatus calculates weighted scores by applying the respective weights of the candidate texts to the scores of the candidate texts. For example, the speech recognition apparatus calculates the weighted scores using Equation 3.

$$c.score2 = c.score1 \times |c.length - avg|/std \quad \text{[Equation 3]}$$

In Equation 3, c.score1 denotes an original score of a current candidate text, and c.length denotes a text length of the current candidate text. avg denotes the average of the text lengths of the candidate texts, and std denotes the standard deviation of the text lengths of the candidate texts. |c.length−avg|/std denotes a weight corresponding to the current candidate text, and c.score2 denotes the score of the current candidate text to which the weight is applied, that is, a weighted score of the current candidate text. The speech recognition apparatus determines the weighted scores of all the candidate texts using Equation 3.

Referring to FIG. 9, the top table (hereinafter, referred to as "Table 1") shows candidate texts corresponding to speech data, scores and text lengths of the candidate texts, and weights corresponding to the text lengths. The weights are determined based on differences between the respective text lengths of the candidate texts and an average text length of all the candidate texts, and the weights increases as the difference increases. When the weights are determined, the weights are applied respectively to the scores of the candidate texts.

The bottom table (hereinafter, referred to as "Table 2") shows the results of adjusting the scores by applying the weights. A candidate text of "when do you get up on Sunday" has a highest score in Table 1, whereas a candidate text of "when you do get up on Sunday not Saturday" has a highest score according to the results of adjusting the scores in Table 2. The speech recognition apparatus determines a candidate text having a highest score to be a target text based on the weighted scores. Thus, the candidate text of "when you do get up on Sunday not Saturday" is determined to be the target text.

Figure 10:
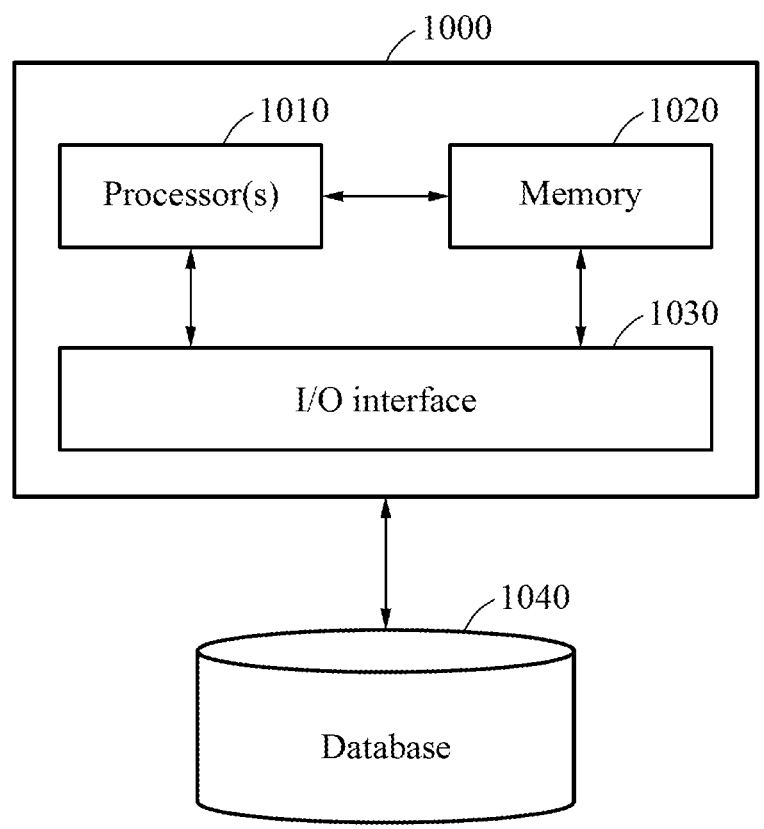
FIG. 10 illustrates an example of a configuration of a speech recognition apparatus.

FIG. 10 illustrates an example of a configuration of a speech recognition apparatus.

Referring to FIG. 10, the speech recognition apparatus 1000 includes one or more processors 1010, a memory 1020, and an input/output (I/O) interface 1030. The speech recognition apparatus 1000 further includes a database 1040 configured to store one or more language models.

The I/O interface 1030 includes a voice interface (for example, a microphone) configured to receive speech data of a speech input. Further, the I/O interface 1030 includes an input interface such as a keyboard, a touch screen, or a touch pad, and an output interface such as a display device or a speaker.

The memory 1020 is connected to the one or more processors 1010 and stores instructions executable by the one or more processors 1010, data to be computed by the one or more processors 1010, or data processed by the one or more processors 1010. The memory 1020 includes, for example, non-transitory computer-readable media such as a high-speed random-access memory, and/or non-volatile computer-readable storage media such as one or more disk storage devices, flash memory devices, or other non-volatile solid state memory devices.

The one or more processors 1010 control the overall operation of the speech recognition apparatus 1000 and execute instructions and/or functions to be performed in the speech recognition apparatus 1000. The one or more processors 1010 perform speech recognition based on the speech data and perform the one or more operations described above with reference to FIGS. 1 through 9 in relation to the speech recognition process.

The one or more processors 1010 receive the speech data and obtain a plurality of candidate texts corresponding to the speech data and respective scores of the candidate texts using a speech recognition model. In response to a text length of a current candidate text satisfying a condition determined based on text lengths of the candidate texts, the one or more processors 1010 adjust a score of the current candidate text. The one or more processors 1010 determine whether to adjust a score of each candidate text based on a text length of the candidate text, determine a weight to be applied to the score, of the candidate text, to be adjusted, and determine a weighted score by applying the weight to the score. The one or more processors 1010 determine a target text corresponding to the speech data among the candidate texts based on a result of adjusting the scores.

In another example, in response to a text length of a candidate text satisfying the condition determined based on the text lengths of the candidate texts, the one or more processors 1010 excludes the candidate text from candidates for the target text. For example, a candidate text with a significantly short or long text length when compared to the average text length of the candidate texts is excluded from the candidates for the target text. The one or more processors 1010 determine the target text based on scores of the remaining candidate texts not excluded.

In still another example, the one or more processors 1010 adjust the scores of the candidate texts overall based on the text lengths of the candidate texts. For example, the one or more processors 1010 determine a weight to be applied a current candidate text included in the candidate texts based on a difference between a text length of the current candidate text and a text lengths determined based on the test lengths of the candidate texts, and determine a weighted score by applying the determined weight to the score of the current candidate text. The one or more processors 1010 determine a candidate text having a highest score to be the target text after adjusting the scores.

When the target text is determined through the above process, the one or more processors 1010 extract a user command from the target text and output a control signal to execute the extracted command.

The speech recognition system 100, the speech recognition apparatus 110, the speech recognition apparatus 1000, and other apparatuses, units, modules, devices, and other components described herein with respect to FIGS. 1-10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD–Rs, CD+Rs, CD–RWs, CD+RWs, DVD-ROMs, DVD–Rs, DVD+Rs, DVD–RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech recognition method, comprising:
   receiving speech data;
   obtaining candidate texts corresponding to the speech data and respective scores of the candidate texts using a speech recognition model;
   adjusting the score of a current candidate text, from among the obtained candidate texts, in response to a text length of the current candidate text satisfying a condition determined based on an average of text lengths of the obtained candidate texts; and
   determining a target text corresponding to the speech data, from among the obtained candidate texts and the current candidate text.

2. The speech recognition method of claim 1, further comprising:
   determining whether a difference between the text length of the current candidate text and a text length determined based on the text lengths of the obtained candidate texts satisfies the condition.

3. The speech recognition method of claim 2, wherein the text length determined based on the text lengths of the obtained candidate texts is the average of the text lengths of the obtained candidate texts.

4. The speech recognition method of claim 2, wherein the text length determined based on the text lengths of the obtained candidate texts is the average of the text lengths of the obtained candidate texts, and the average of the text lengths excludes a greatest text length and a smallest text length among the obtained candidate texts.

5. The speech recognition method of claim 2, wherein determining whether the difference satisfies the condition comprises determining that the condition is satisfied, in response to the difference being greater than a threshold determined based on a standard deviation of the text lengths of the obtained candidate texts.

6. The speech recognition method of claim 1, wherein the adjusting comprises:
   determining a weight corresponding to the current candidate text; and
   determining a weighted score by applying the weight to the score of the current candidate text.

7. The speech recognition method of claim 6, wherein determining the weight comprises determining a weight to be applied to the current candidate text based on a difference between the text length of the current candidate text and a text length determined based on the text lengths of the obtained candidate texts.

8. The speech recognition method of claim 6, wherein a probability value or an expected value that the current candidate text is determined to be the target text decreases in response to the weight being applied to the score of the current candidate text.

9. The speech recognition method of claim 6, wherein determining the target text comprises determining the target text based on the weighted score of the current candidate text and a score of another candidate text.

10. A non-transitory computer-readable storage medium storing instructions that, when executed by a processor, cause the processor to perform the speech recognition method of claim 1.

11. A speech recognition method, comprising:
    receiving speech data;
    obtaining candidate texts corresponding to the speech data and respective scores of the candidate texts using a speech recognition model; and
    determining a target text corresponding to the speech data based on the scores of the obtained candidate texts other than a current candidate text, in response to a text length of the current candidate text satisfying a condition determined based on an average of text lengths of the obtained candidate texts.

12. The speech recognition method of claim 11, further comprising:
    determining whether a difference between the text length of the current candidate text and a text length determined based on the text lengths of the obtained candidate texts satisfies the condition.

13. The speech recognition method of claim 12, wherein the text length determined based on the text lengths of the obtained candidate texts is the average of the text lengths of the obtained candidate texts, and the average of the text lengths of the obtained candidate texts is an average of all of the text lengths of the obtained candidate texts or an average of the obtained candidate texts excluding a greatest text length and a smallest text length among the obtained candidate texts.

14. The speech recognition method of claim 12, wherein determining whether the difference satisfies the condition comprises determining that the condition is satisfied, in response to the difference being greater than a threshold determined based on a standard deviation of the text lengths of the obtained candidate texts.

15. The speech recognition method of claim 11, wherein determining the target text comprises determining a candidate text having a highest score among the obtained candidate texts other than the current candidate text, to be the target text.

16. A speech recognition method, comprising:
receiving speech data;
obtaining candidate texts corresponding to the speech data and respective scores of the candidate texts using a speech recognition model;
adjusting the respective scores of the candidate texts based on an average of text lengths of the candidate texts; and
determining a target text corresponding to the speech data, from among the candidate texts, based on a result of the adjusting.

17. The speech recognition method of claim 16, wherein the adjusting comprises:
determining a weight corresponding to a current candidate text included in the obtained candidate texts; and
determining a weighted score by applying the weight corresponding to the current candidate text to the score of the current candidate text.

18. The speech recognition method of claim 17, wherein determining the weight comprises determining a weight to be applied to the current candidate text based on a difference between a text length of the current candidate text and a text length determined based on the text lengths of the obtained candidate texts.

19. The speech recognition method of claim 18, wherein the text length determined based on the text lengths of the obtained candidate texts is the average of the text lengths of the obtained candidate texts.

20. The speech recognition method of claim 17, wherein determining the weight comprises determining a weight to be applied to the current candidate text, based on a difference between a text length of the current candidate text and a text length determined based on the text lengths of the obtained candidate texts and a standard deviation of the text lengths of the obtained candidate texts.

21. The speech recognition method of claim 17, wherein determining the target text comprises determining the target text based on weighted scores determined by applying weights of the obtained candidate texts to the respective scores of the obtained candidate texts.

22. A speech recognition apparatus, comprising:
one or more processors,
wherein the one or more processors are configured to:
receive speech data,
obtain candidate texts corresponding to the speech data and respective scores of the candidate texts using a speech recognition model,
adjust the score of a current candidate text, from among the obtained candidate texts, in response to a text length of the current candidate text satisfying a condition determined based on an average of text lengths of the obtained candidate texts, and
determine a target text corresponding to the speech data, from among the obtained candidate texts and the current candidate text.

23. The speech recognition apparatus of claim 22, wherein the one or more processors are further configured to determine whether a difference between the text length of the current candidate text and a text length determined based on the text lengths of the obtained candidate texts satisfies the condition.

24. The speech recognition apparatus of claim 22, wherein the one or more processors are further configured to determine a weight corresponding to the current candidate text, in response to the text length of the current candidate text satisfying the condition, and determine a weighted score by applying the weight to the score of the current candidate text.

25. A speech recognition apparatus, comprising:
one or more processors,
wherein the one or more processors are configured to:
receive speech data,
obtain candidate texts corresponding to the speech data and respective scores of the candidate texts using a speech recognition model, and
determine a target text corresponding to the speech data based on the scores of the obtained candidate texts other than a current candidate text, in response to a text length of the current candidate text satisfying a condition determined based on an average of text lengths of the obtained candidate texts.

26. A speech recognition apparatus, comprising:
one or more processors,
wherein the one or more processors are configured to:
receive speech data,
obtain candidate texts corresponding to the speech data and respective scores of the candidate texts using a speech recognition model,
adjust the respective scores of the candidate texts based on an average of text lengths of the candidate texts, and
determine a target text corresponding to the speech data, from among the candidate texts, based on the adjusted scores.

27. The speech recognition apparatus of claim 26, wherein the one or more processors are further configured to:
determine a weight to be applied to a current candidate text included in the obtained candidate texts based on a difference between a text length of the current candidate text and a text length determined based on the text lengths of the obtained candidate texts, and
determine a weighted score by applying the weight corresponding to the current candidate text to the score of the current candidate text.

28. A processor-implemented method, comprising:
obtaining candidate texts corresponding to received speech data and a score for each of the candidate texts using a speech recognition model;
adjusting the score of one or more of the candidate texts based on a difference between a text length of each of the respective one or more candidate texts and a value that is calculated based on an average of text lengths of a plurality of the obtained candidate texts; and
after the adjusting, selecting a target text that corresponds to the speech data based on the scores of the candidate texts, and outputting the target text.

29. The processor-implemented method of claim 28, wherein the plurality of the obtained candidate texts includes all of the obtained candidate texts.

30. The processor-implemented method of claim 28, wherein the plurality of the obtained candidate texts includes all of the obtained candidate texts except for at least one of the obtained candidate texts having a largest text length or a smallest text length.

31. The processor-implemented method of claim 28, wherein the value is the average of the text lengths of the plurality of obtained candidate texts.

32. The processor-implemented method of claim 28, wherein the value is based on a standard deviation of the text lengths of the plurality of obtained candidate texts.

\* \* \* \* \*